United States Patent [19]

Richter et al.

[11] 4,291,573

[45] Sep. 29, 1981

[54] REJECT SYSTEM FOR IN-LINE PRESSURE TESTING SYSTEMS

[75] Inventors: Simon J. Richter, Marietta, Ga.; Michael Sanscharowskiy, Horseheads, N.Y.

[73] Assignee: The Coca-Cola Company, Atlanta, Ga.

[21] Appl. No.: 973,918

[22] Filed: Dec. 28, 1978

[51] Int. Cl.[3] .............................................. G01M 3/32

[52] U.S. Cl. ........................................ 73/37; 73/45.1; 73/49.2; 209/522; 209/559

[58] Field of Search ...................... 73/37, 41, 45, 45.1, 73/45.2, 49.2; 209/522, 530, 559, 591

[56] References Cited

U.S. PATENT DOCUMENTS

| | | | |
|---|---|---|---|
| 3,010,310 | 11/1961 | Rowe | 73/45 |
| 3,301,399 | 1/1967 | Ochs | 209/530 X |
| 3,438,492 | 4/1969 | Albers et al. | 209/559 X |
| 3,489,275 | 1/1970 | Powers, Jr. | 73/37 X |
| 3,683,676 | 8/1972 | Hass | 73/45.1 |
| 3,894,424 | 7/1975 | Taylor et al. | 73/49.2 |
| 4,061,014 | 12/1977 | Bott et al. | 73/45.1 |

FOREIGN PATENT DOCUMENTS

| | | | |
|---|---|---|---|
| 2514980 | 10/1976 | Fed. Rep. of Germany | 209/522 |
| 46705 | 9/1971 | Japan | 73/41 |

*Primary Examiner*—S. Clement Swisher
*Assistant Examiner*—Joseph W. Roskos

[57] ABSTRACT

A device is provided for testing the integrity of each container in a conveyed sequence of containers by individually applying pressure internally of each, sensing that pressure and generating a signal having a magnitude corresponding to the value of that pressure, comparing that signal magnitude to a selected threshold signal value, providing an output control signal indicative of the achievement of that signal magnitude and setting an enablement device in one of two states corresponding to the presence and absence, respectively, of that output control signal. One of those states corresponds to an unacceptable container condition and the other to an acceptable container condition. If the unacceptable container condition or reject state exists, a reject cycle is enabled over at least an enabling duration sufficient to clear the container or broken portion thereof from the position it occupies in the sequence. The reject apparatus enabled during the reject cycle is constrained to apply a reject force such as a jet of air over the space occupied by the unacceptable container as well as space upstream therefrom within the extent of the reject cycle to clear from the conveyor all debris associated with the unacceptable container. A counter is provided in several embodiments for determining the number of acceptable containers in a give sequence. A mechanical reject device extends and retracts within the selected enabling duration while the air is enabled for the duration of the reject cycle to purge the conveyor surface.

23 Claims, 9 Drawing Figures

REJECT SYSTEM FOR IN-LINE PRESSURE TESTING SYSTEMS

FIELD OF THE INVENTION

This invention relates to systems for testing the integrity of bottles and the like by subjecting them to hydrostatic pressure as they move along a conveyor device and more particularly, to a bottle condition determination and reject means for such an on-line pressure testing system.

BACKGROUND OF THE INVENTION

The conveying apparatus and general machinery structure for a hydrostatic bottle testing device to which the present invention is related is disclosed in U.S. Pat. No. 3,894,424 to Taylor et al entitled "On-line Pressure Testing System" and issued July 15, 1975. The disclosure and illustrations of this patent are incorporated by reference herein.

The above-referenced Taylor et al patent, for detecting the presence of undesirable bottles which had been previously hydrostatically loaded, utilized a photocell sensing device for determining whether or not a bottle had collapsed and therefore disappeared from view of the photocell or whether the bottle had cracked and therefore, had a liquid level therein which was lower than a predetermined standard level.

Theoretically, both of these conditions were electrically identical in that the photocell would see light under both of those conditions. On the other hand, a good container which was full of water and has not disappeared from the view of the photocell presented a different optical property and would preclude the generation of a reject signal due to the difference in response of the photocell to the presence of a water filled bottle.

The photocell was interrogated at a particular time in the test cycle to enable a reject signal, if generated, to drive a suitable reject mechanism to remove the undesirable bottle from a conveyor carrying the bottles being tested past the photocell and also, to activate air jet cleaning devices or the like to clear the debris off of the conveyor in the event of broken bottles and glass fragments or the like.

Upon operation of this testing device of Taylor et al, certain disadvantages due to problems of sensitivity, difficulties of fine adjustments, and criticality of timing with respect to bottle position and the interrogation signal for the photocell were noted and the need for an improved system of both undesirable bottle detection and rejection became apparent.

A system was desired in which the detection of the presence or absence of water pressure in a given bottle would occur as late as possible in the pressure cycle in that bottle as applied thereto by a hydrostatic pressure head such that a good container would have a significant and detectable pressure level therein while a container which had collapsed or cracked would have little or no pressure. Thus, the difference between a bottle with full integrity and one of undesirable or unacceptable integrity would be sufficiently substantial to provide a reliable measurement of that difference.

It is, therefore, an object of the present invention to provide an improved hydrostatic pressurization and detecting means for accurately determining the hydrostatic testing pressure in a bottle at a specifically desired point in the hydrostatic test pressure cycle.

Another object of the present invention is to provide a new and novel means for remembering the occurrence of a bottle of unacceptable integrity such that the unacceptable bottle can be free of the hydrostatic pressurization mechanism and in an unconstrained and more readily rejectable state prior to initiation of a reject cycle.

Still an another object of the present invention is to provide a new and novel reject control means for removing bottles of undesirable integrity from a hydrostatic test pressure device immediately downstream from the hydrostatic test pressure station.

Yet another object of the present invention is to provide a new and novel air jet conveyor cleaning apparatus for a hydrostatic bottle integrity testing mechanism which is synchronized and timed with the mechanical reject mechanism and the spacing of the bottles being tested on a conveyor means to maintain the conveyor clear and clean of glass fragments downstream of the reject station.

These and other objects of the present invention will become more fully apparent with reference to the following specification and drawings which relate to a preferred embodiment of the present invention.

SUMMARY OF THE INVENTION

A sequence of substantially uniformly spaced bottles is conveyed through a preliminary filling apparatus which injects water into each bottle to its brim full capacity. Thereafter, the filled bottles are carried at a predetermined rate and spacing such as by a screw conveyor or the like, past a hydrostatic test head station at which a hydrostatic test head is synchronously reciprocated to engage and seal with the open top, at the brim, of each successive bottle.

The hydrostatic test head applies a downward force to the continuously moving bottle at the brim or sealing surface thereof, with a force sufficient to contain hydrostatic pressure which is subsequently applied to the interior of the bottle after the seal between the hydrostatic test head and the brim of the bottle is effectuated.

The bottle is then subjected to a prescribed internal hydrostatic pressure for a prescribed time interval or test cycle, from a suitable source of hydrostatic pressure such as a high pressure water pump which feeds pressure fluid to the interior of the bottle through the hydrostatic test head. A pressure sensing tube and sensing assembly are provided in the hydrostatic test head immediately adjacent to the sealed brim area of the bottle to transmit the resultant internal hydrostatic pressure in that bottle under test to a pressure transducer device serving as an input to a selective reject mechanism.

Should the bottle under the influence of the hydrostatic test pressure fail or crack upon the application of the hydrostatic pressure during the test cycle the resultant pressure drop will cause actuation of the reject mechanism of the present invention to remove the bottle from the conveyor and subsequent to that removal, clean any fragments from the bottle off of the conveyor by means of a timed air blast. This air blast is directed transversely of the conveyor during the time interval normally occupied by the space between the bottle under test and the next successive bottle in the conveyed series or sequence of bottles.

The pressure transducer connected with the hydrostatic test head provides a proportionate voltage output to the internal bottle pressure. This voltage output drives a threshold detector which energizes a threshold or good bottle relay which, when energized, precludes the reject mechanism from operating and provides a count signal to a good bottle counting device.

In the event that the threshold of pressure has not been exceeded within the bottle under test, the good bottle relay will not be actuated and at a point within the hydrostatic test pressure cycle interrogate switch, operated by a timing cam synchronized with the pressure test head and bottle position, will be closed, completing a circuit to a memory release solenoid which unlatches a reject cam driven by a common timing shaft with the interrogate switch and synchronized with the conveyor movement and hydrostatic test head cycle such that upon release of the bottle of undesirable integrity (lower than threshold pressure) from the hydrostatic test head, and after a predetermined amount of translation downstream therefrom, a mechanical reject mechanism will be energized by the now operative reject cam to eject the undesirable bottle from the conveyor. The reject cam thus constitutes a mechanical memory which remembers the fact of a bad bottle after its release from the hydrostatic test pressure head so that the proper bottle can be ejected from the conveyor downstream of the hydrostatic test pressure station.

The reject cam includes a reject cam lobe which engages a microswitch for a predetermined duration. That microswitch causes a reject solenoid to actuate a paddle mechanism to remove the undesirable bottle from the conveyor and at the same time commence a timing cycle for an air blast directed transversely of the conveyor. This air blast is controlled by an air jet solenoid which can be timed in and out to synchronize with the mechanical reject mechanism or paddle and the space between the undesirable bottle and the next successive bottle in the series under test.

In the event that certain pockets in the screw conveyor or incremental conveyor leading the bottles past the hydrostatic test pressure station are empty, the cyclic interrogation will result in a reject cycle due to the lack of threshold pressure and both the paddle mechanism and air blast will be energized to ensure that any bottle fragments or debris which might have been occasioned by a broken bottle, thereby accounting for the absence of a bottle at a given conveyor position, will be removed from the conveyor.

DETAILED DESCRIPTION OF THE DRAWINGS

Figure 1:
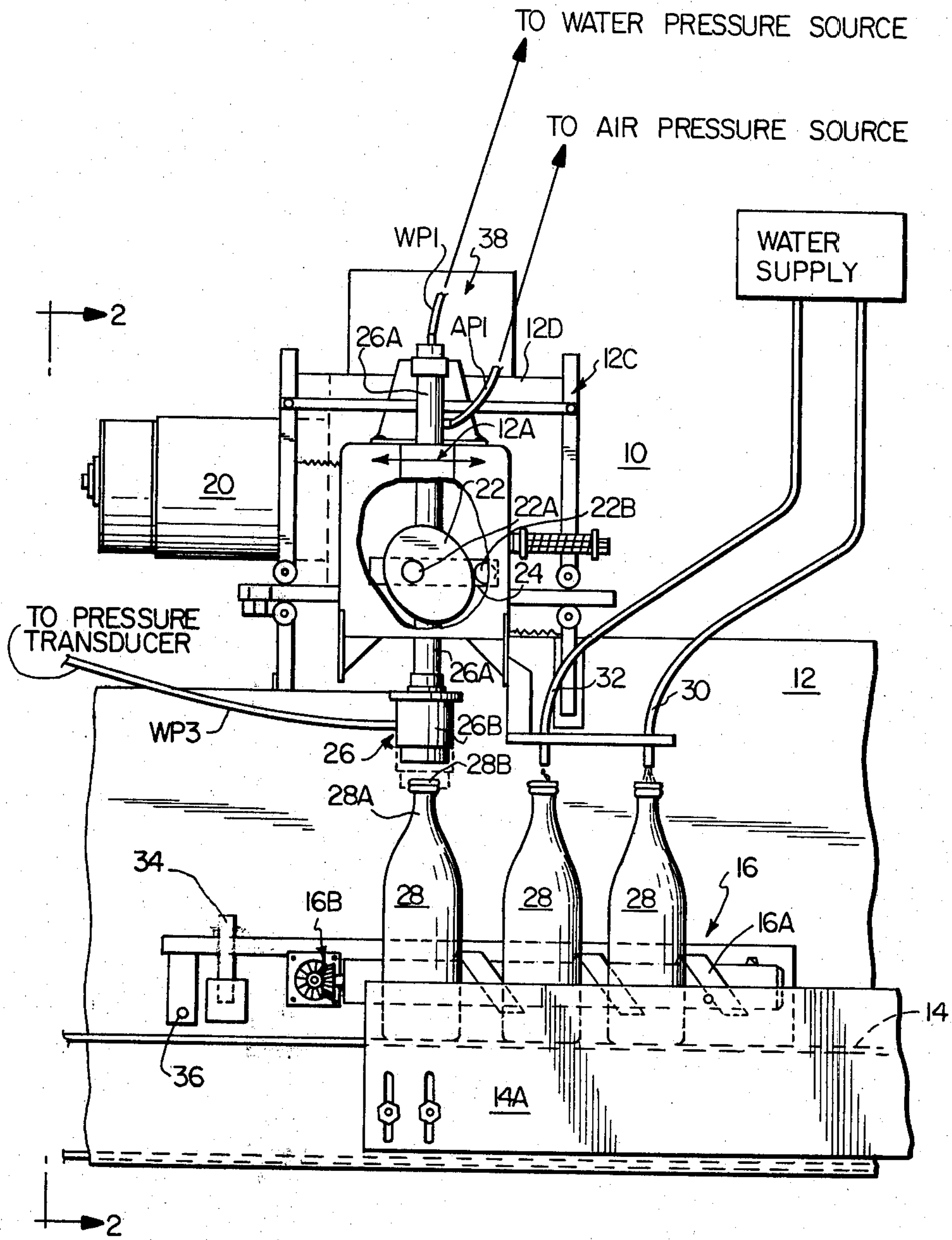
FIG. 1 is a front view of a hydrostatic pressure bottle testing station of the present invention.
Figure 2:
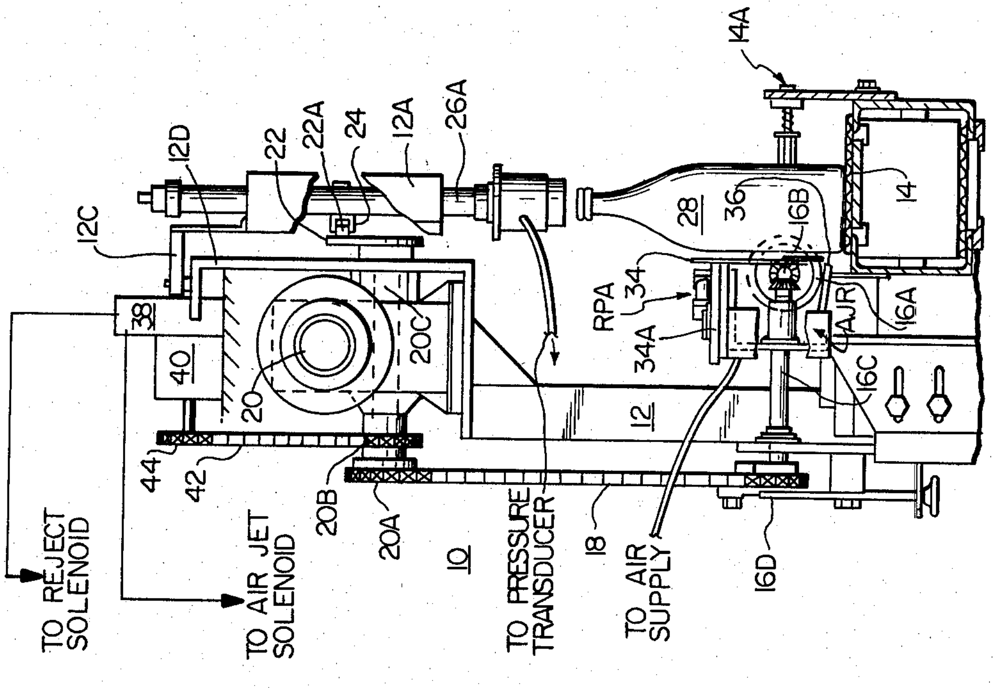
FIG. 2 is an end view of the hydrostatic pressure testing station of FIG. 1.

Referring in detail to the drawings and with particular reference to FIGS. 1 and 2, a hydrostatic pressure bottle testing station 10 of the present invention is shown as including a vertically disposed machine frame 12 having a horizontally disposed endless metallic conveyor 14 at the lower side thereof and extending parallel thereto through an indexing screw conveyor station 16 which consists of an indexing auger or screw conveyor device 16A driven by a suitable bevel gear means 16B.

The input side of the bevel gear assembly 16B comprises a driven shaft 16C suitably journalled in the machine frame 12 and extending outward to a first timing sprocket 16D which is driven by a timing chain 18 from a common drive motor 20 mounted above the indexing screw conveyor station 16 on the machine frame 12.

The drive motor 20 drives the timing chain 18 through a first main drive sprocket 20A which is mounted on a common shaft with a second main drive sprocket 20B, the latter being for a purpose to be hereinafter more fully described.

The main drive sprockets 20A and 20B are commonly mounted on a main timing shaft 20C on which is mounted an eccentric cam drive 22 having a follower engaging offset cam roller 22A thereon outboard of the center line of the main timing shaft 20C. The drive roller 22A on the cam drive 22 engages a cam follower slide 24 which is integrally affixed to the outer reciprocating sheath 26A of a hydrostatic pressure head assembly 26. The relationship between the main timing shaft 20C, cam 22, drive roller 22A, cam follower 24 and the outer sheath 26A of the hydrostatic pressure head assembly 26 is further illustrated in FIG. 3.

Thus, it can be seen that through the timing chain 18, the indexing screw conveyor 16A and the cam drive roller 22A are driven in timed relationship.

The hydrostatic pressure head assembly 26 is mounted by means of its outer sheath 26A in a vertical journal or sliding bearing assembly 12A integrally affixed to the machine frame 12 such that the action of the cam roller 22A on the cam follower 24 causes a timed reciprocation of the hydrostatic pressure head assembly 26 in synchronism with the action of the screw conveyor 16A.

As a result, a series of filled bottles entering the hydrostatic pressure testing station 10 on the metallic conveyor 14, when engaged by the indexing screw conveyor 16A, are translated through the hydrostatic pressure station in synchronism with the reciprocating motion of the hydrostatic pressure head assembly 26 to thereby individually index each bottle with the hydrostatic pressure head. These bottles are indicated by the numeral 28.

As the bottles 28 under inspection enter the hydrostatic testing station 10, they have been prefilled substantially to the brim with water at a previous work station, not shown, and pass beneath a rapid-fill water injection means 30 and subsequently, a drip-fill water injection means 32 such that just prior to entering into a position beneath the hydrostatic pressure head assembly 26, each bottle 28 is filled substantially exactly to the brim thereof.

Then, when the bottle 28 has been conveyed by the indexing screw conveyor 16A to a point directly beneath the hydrostatic pressure head assembly 26, the cam roller 22A and follower 24 will have caused the assembly 26 to reciprocate downwardly into engagement with the brim of the bottle to apply a hydrostatic test pressure thereto as will be hereinafter more fully described.

Subsequent to this application of pressure, the pressure is sensed and a decision by the reject control module and control circuit of the present invention, to selectively enable suitable reject means comprising a reject paddle assembly 34 and a conveyor clearing air jet means 36 for the purpose of removing bottles of undesirable integrity or fragments of such bottles from the surface of the endless conveyor 14 at a point downstream of the hydrostatic pressure head assembly 26.

The bottles 28 are held in close proximity with the indexing screw conveyor 16A by means of a spring-loaded rail assembly 14A which is mounted on the portion of the frame supporting the conveyor 14.

Figure 3:
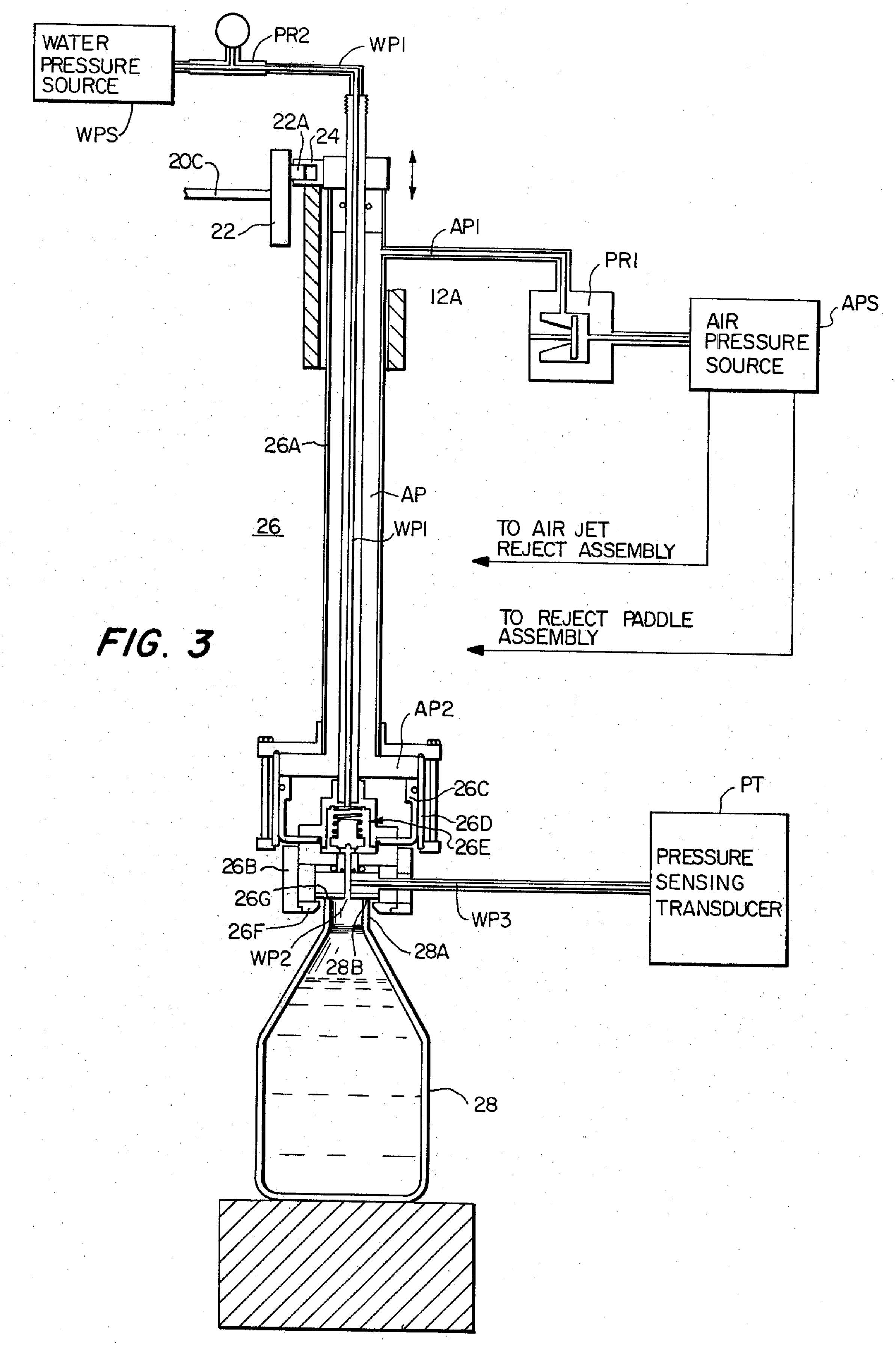
FIG. 3 is a schematic of the hydrostatic pressure testing head and drive assembly therefor illustrating some of the internal detail of the hydrostatic test head illustrated in FIGS. 1 and 2.

As specifically shown in FIG. 3, the reciprocating sheath 26A of the hydrostatic pressure head assembly 26 provides an internal air pressure chamber AP which has an input connection AP1 at the uppermost end of the outer sheath 26A and an expansible air pressure chamber AP2 at the base or bottle engaging head portion 26B of the hydrostatic pressure head assembly 26. The expansible pressure chamber AP2 is comprised of a hollow piston 26C slidably mounted in a cylinder 26D and spring-biased in an upward direction by a valve and spring means 26E.

A central water pressure line WPL is provided coaxially of the reciprocating sheath 26A and extends from a water pressure input WP1 at its uppermost end to a water pressure outlet WP2 at the lowermost portion of the valve spring assembly 26E.

The bottle engaging head portion 26B of the hydrostatic pressure head assembly 26 includes an annular bottle guide ring 26G which receives the neck portion 28A of the brim filled bottle 28 under test such that when the hydrostatic pressure head assembly 26 is reciprocated downwardly by the cam roller 22A and follower 24, the brim 28B and bottle neck 28A are received into the bottle engaging head portion 26B such that the brim 28B will seal with a sealing pad 26G on the lowermost extremity of the valve and spring assembly 26E.

The valve and spring assembly 26E is any suitable pressure transmitting valve which communicates water pressure from the internal water pressure line WPL through the water pressure outlet WP2 into the interior of the bottle 28 in response to engagement of the brim 28B of the bottle 28 with the sealing pad 26G and may be of the type generally described in prior U.S. Pat. No. 3,894,424 as above referenced.

The water pressure outlet WP2 is part of a T-branch which provides a second water pressure sensing line WP3 extending from the head of the valve 26E outward through the bottle engaging head 26B to a pressure sensing transducer PT, the latter providing a suitable output function such as one volt per 100 psig of water pressure over a 500 psig range. The outer boundaries of this pressure variation range are determined by the type of bottle under test and the typical pressures which must be withstood by such bottles consistent with safety factors and standards in the industry.

A suitable air pressure source APS is connected to the air pressure input AP1 through a suitable pressure regulating device PR1 and a water pressure source WPS is connected to the water pressure input WP1 through a suitable pressure regulating device PR2.

Thus, upon reciprocation of the hydrostatic pressure head assembly 26, the expandable air chamber AP2 and the sliding piston 26P contained therein act as a cushion against which the brim 28B of the bottle react when it engages the sealing plate 26G on the lowermost portion of the valve assembly to thereby provide a resilient engagement between the glass bottle under test and the hydrostatic head assembly 26 to prevent breakage of the bottle by the action of the head thereon.

As illustrated generally in FIG. 1 and as disclosed in prior U.S. Pat. No. 3,894,424 as above referenced, the uppermost portion 12C of the frame 12, including the bearing means 12A for retaining the hydrostatic pressure head assembly 26 in sliding relationship in the vertical direction, is designed for a horizontal component of motion which follows the translation of the bottle 28 during the time which it is beneath the hydrostatic pressure head assembly 26 so that a continuous motion of the bottle 28, as opposed to an intermittent feed thereof, can be achieved.

In other words, the reciprocation of the hydrostatic pressure head 26 in the vertical direction is accompanied by a simultaneous horizontal translation thereof in synchromisn with the translation of the bottle 28 such that the central axis of the hydrostatic pressure head assembly remains substantially coaxial with the central axis of the upstanding bottle 28 under test during the time frame in which that bottle is beneath the operative reach of the hydrostatic pressure head assembly 26.

A second cam follower in the form of a roller bearing 22B or the like is mounted on the cam follower track 24 on the bearing assembly 12A as illustrated in FIG. 1 for engaging the outermost periphery of the eccentric cam drive 22 for the purpose of providing the horizontal motion to the bearing assembly 12A and the uppermost assembly 12C of the machine frame 12 in synchronism with the reciprocating motion of the hydrostatic pressure head assembly 26.

The vertical machine frame 12 is provided with an additional vertical extension 12D extending above the main drive motor 20 on which is mounted a reject control module 38, the latter having an input drive means 40 driven from the second main sprocket 20B by means of a second timing chain 42 and drive sprocket 44.

Figure 5:
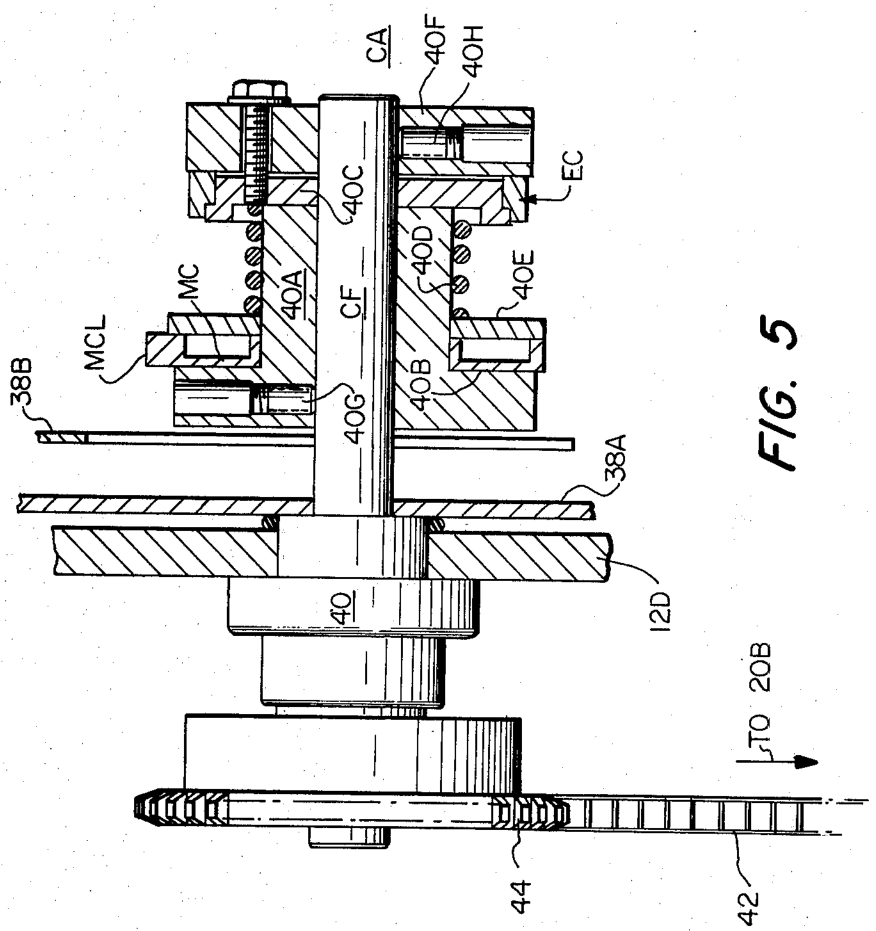
FIG. 5 is a cross-section taken along line 5—5 of FIG. 4 illustrating the means for driving the interrogate and reject cams of the reject control module of the present invention.
Figure 4:
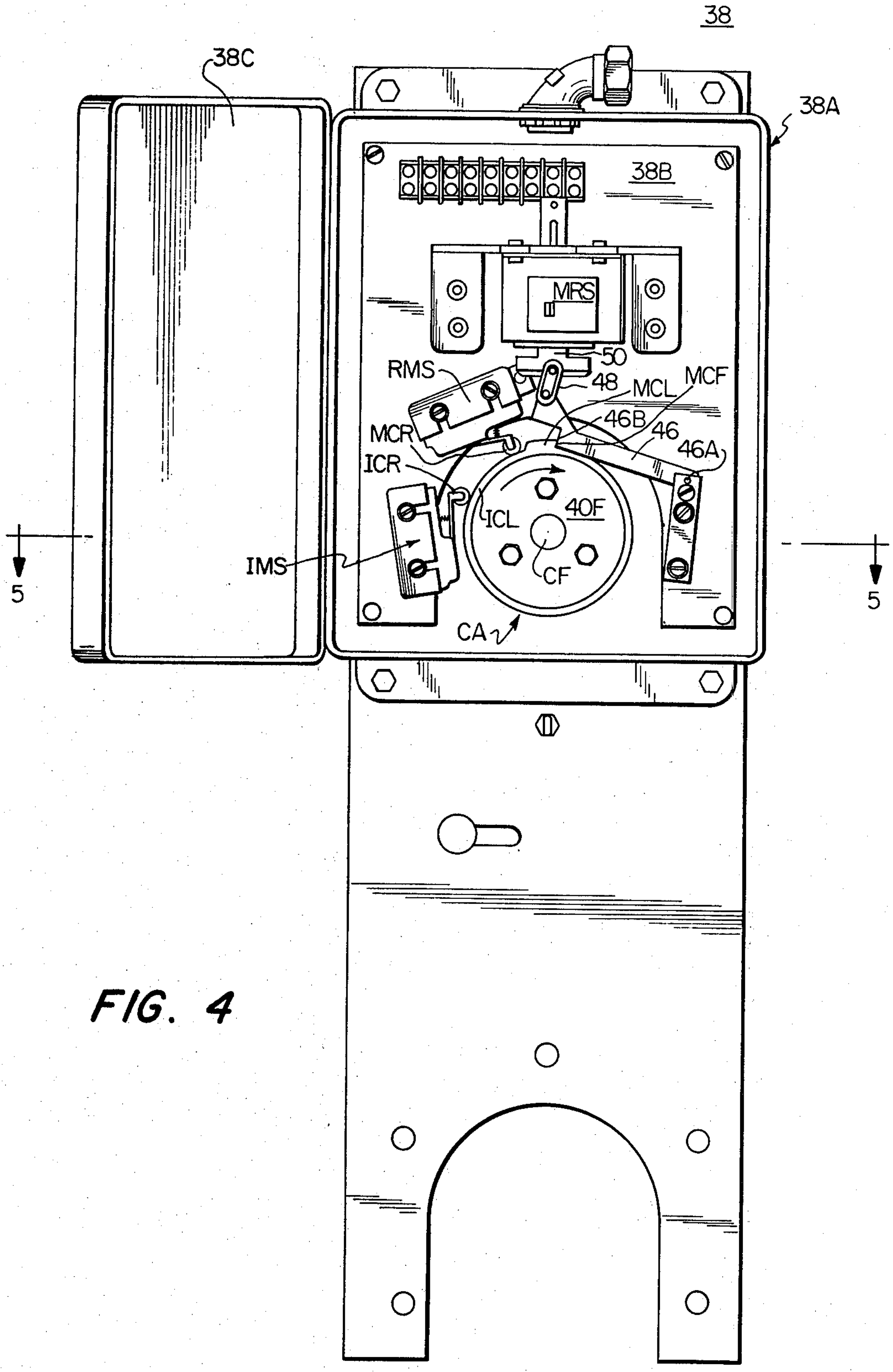
FIG. 4 is a front view of a reject control module of the present invention.

The reject control module 38 is shown in FIGS. 4 and 5 and will now be described with reference to these two figures.

The reject control module 38 is shown as including a housing 38A having a main mounting plate 38B therein, the latter being selectively covered over by a closure member or door 38C, and mounting at its lowermost central portion, a cam assembly CA consisting of an interrogate cam IC and a memory cam MC, these two cams being coaxially disposed on a common cam shaft CF.

The interrogate cam IC is provided with an interrogate cam lobe ICL and the memory cam MC is provided with a memory cam lobe MCL which by their peripheral length control the duration of the interrogate and reject cycles, respectively, in a manner to be hereinafter more fully described.

The common cam shaft CF is an integral extension of the drive means 40 for the control module 38, the said drive means 40 comprising a journal means in the uppermost portion 12D of the machine frame 12 which extends through the rear of the outer housing 38A of the module 38 and through the mounting plate 38B thereof to support both the interrogate cam IC and the memory cam MC thereon by means of a hub assembly 40A having an annular thrust shoulder 40B adjacent the mounting plate 30B and terminating adjacent an annular interrogate cam clamp 40C, the latter providing a reaction surface for one end of a compression spring 40D which is concentric with the hub 40A.

The opposite end of the spring 40D reacts against the outermost surface of an annular clutch plate 40E which is adapted to frictionally engage the outermost side surface of the memory cam MC from the mounting plate 38B and press it against the thrust shoulder 40B of the hub 40A. Thus, a slip drive is provided for the memory cam MC such that is can be detained from rotation by selectively engaging the periphery thereof with a cam stop or latch member 46, illustrated in FIG. 4 and hereinafter to be more fully described.

The interrogate cam IC is held between the interrogate cam retaining clamp 40C and an outer hub device 40F such that the interrogate cam IC must always rotate with the common cam shaft CF.

The main hub 40A is held in fixed relationship to the common cam shaft CF for rotation therewith by a suitable set screw device 40G while the outer hub 40F is held in fixed relationship to the cam shaft CF by a set screw device 40H. Also, the compression spring 40D and floating clutch plate 40E are basically rotatable with the cam shaft CF, the main hub 40A and the interrogate cam clamping plate 40C to thereby constrain the memory cam MC to rotate with the cam shaft CF unless restrained by the latching member 46.

Positioned on the mounting plate 38B immediately adjacent the interrogate cam IC for actuation by the interrogate cam lobe ICL, is an interrogate microswitch assembly IMS having a cam follower arm and roller assembly ICR. A reject microswitch assembly RMS having a cam follower arm and roller assembly MCR is also mounted on the mounting plate 38B of reject module 38 adjacent to the memory cam MC for actuation by the memory cam lobe MCL.

The memory cam latching lever 46 extends from a fixed pivot point 46A on the right-hand side of the mounting plate 38B and overlies the periphery of the memory cam MC such that a dependent detent or shoulder portion 46B thereof engages a sharp rise MCF on the leading edge of the memory cam lobe MCL. As shown, the memory cam MC and the interrogate cam IC together with the outer hub portion 40F rotate in a clockwise manner in the configuration of FIG. 4.

The inboard or free end of the latching lever 46 is connected by a drag link 48 with the armature 50 of a memory release solenoid MRS which is mounted on the mounting plate 38B above the cam assembly CA in the reject module 38.

The structure of the reject module 38 having now been described, reference is hereby made to FIGS. 6A and 6B in which the bottle selection detecting and reject control circuit 60 will now be described.

The sensing and reject control circuit 60 includes the pressure transducer PT which is schematically illustrated as receiving bottle pressure from the pressure output WP3 on the hydrostatic pressure test head 26 and which comprises a commerically available pressure transducer known as a Viatran pressure transducer #218-15 having a zero to 500 psig rating and a characteristic of one volt output per 100 psig input. This commercially available component has conventionally labeled terminal pins 1-7 which are connected as follows:

Pins 5 and 6 are adapted to be connected through a push-button switch 62 which has a push-to-calibrate function. Terminal pin 3 is driven by an internal bridge detector and operational amplifier 64A and 64B, respectively, and provides a positive output signal representative of the hydrostatic test pressure to one input of an operational amplifier 66 contained in a threshold detector circuit TD in which the said operational amplifier 66 is connected as a voltage comparator and is a commercially available operational amplifier known as a 741 operational amplifier. The said one input of the operational amplifier 66 is terminal pin #5 in the commercial component. The reference input of the amplifier 66 is terminal pin #4 and is connected through a series capacitor C1 to the common terminal pins #4 and #7 of the pressure transducer PT and through a series resistor R1 to the variable tap of a reference potentiometer RP. The capacitor C1 is also connected in series with a second resistor R2 and a HIGH/LOW range switch HLS to one side of the reference potentiometer RP while the other side of the latter is connected to the common terminal pins #4 and #7 of the pressure transducer PT at the junction RJ1 between the capacitor CL and second resistor R2.

The common connection RJ2 between the HIGH/-LOW range switch HLS and the reference potentiometer RP is connected through a third resistor R3 to a third junction RJ3 which is clamped at a first voltage V1 above ground by a first Zener diode ZD1.

The third junction RJ3 is directly connected to terminal pin #11 of the operational amplifier 66 to serve as a first power terminal for that amplifier; and also, is connected through a fourth resistor R4 to the positive direct current terminal 68A of a power supply 68.

The amplifier 66 has a second power terminal at its terminal pin #6 which is connected to a fourth junction RJ4, the latter being clamped to a second voltage V2 below ground by a second Zener diode ZD2; and the fourth junction RJ4 being connected through a fifth resistor R5 to the negative direct current terminal 68B of the power supply 68.

The power supply 68 has a common terminal 68C connected to the first junction RJ1 of the threshold detector circuit TD.

The output of the operational amplifier 66 is provided at its terminal pin #10 and drives the base of a control transistor 70 through the forward conducting path of a coupling diode D1.

The control transistor 70 has its collector connected in common to the terminal pin #1 of the pressure transducer PT, one side of the fourth resistor R4 and the positive DC terminal 68A of the power supply 68 and its emitter connected through the winding ERW of an enabling relay ER to the terminal pin #2 of the pressure transducer PT and the negative DC terminal 68B of the power supply 68 at its common connection with the fifth resistor R5. A reverse current protection diode D2 is connected from this last recited common connection to the emitter of the control transistor 70 across the enabling relay winding ERW.

Thus, it can be seen that the DC side of the power supply 68 energizes both the pressure transducer PT and the threshold detector circuit TD.

The power supply 68 is provided with a pair of alternating current inputs 68D and 68E connected, respectively, to first and second common power leads PLD and PLE. A lamp PL is provided as an indication of available AC power at the power supply 68.

The alternating current potential across the common AC power leads PLD and PLE is 110 volts, derived from a conventional source (not shown). Therefore, all of the various relays and timing modules to be hereinafter more fully described are rated for 110 volts AC unless connected otherwise or otherwise defined.

Figure 6A:
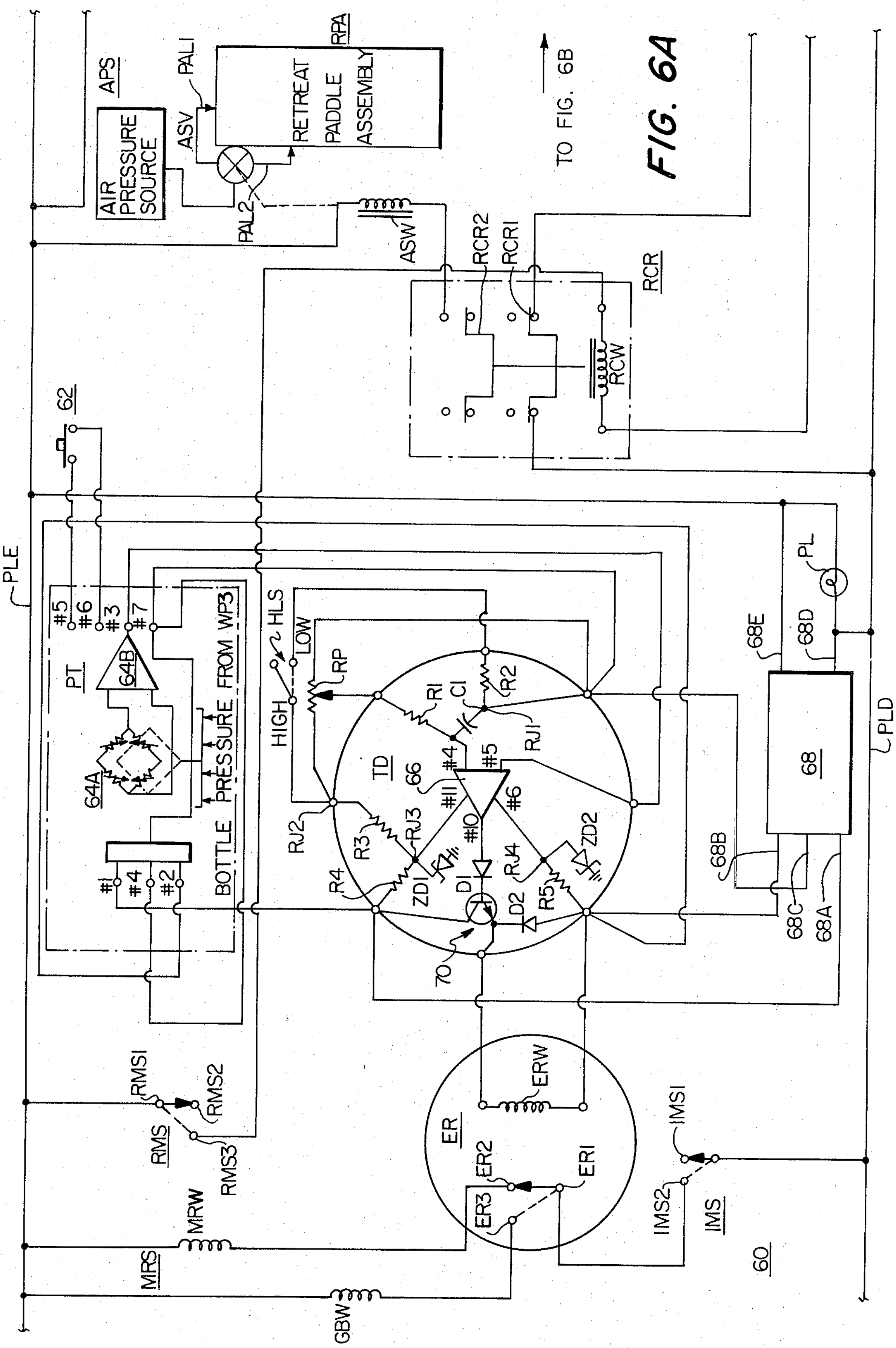
FIGS. 6A and 6B together are a schematic diagram of the bottle sensing, evaluating and reject control circuit of the present invention.
Figure 6B:
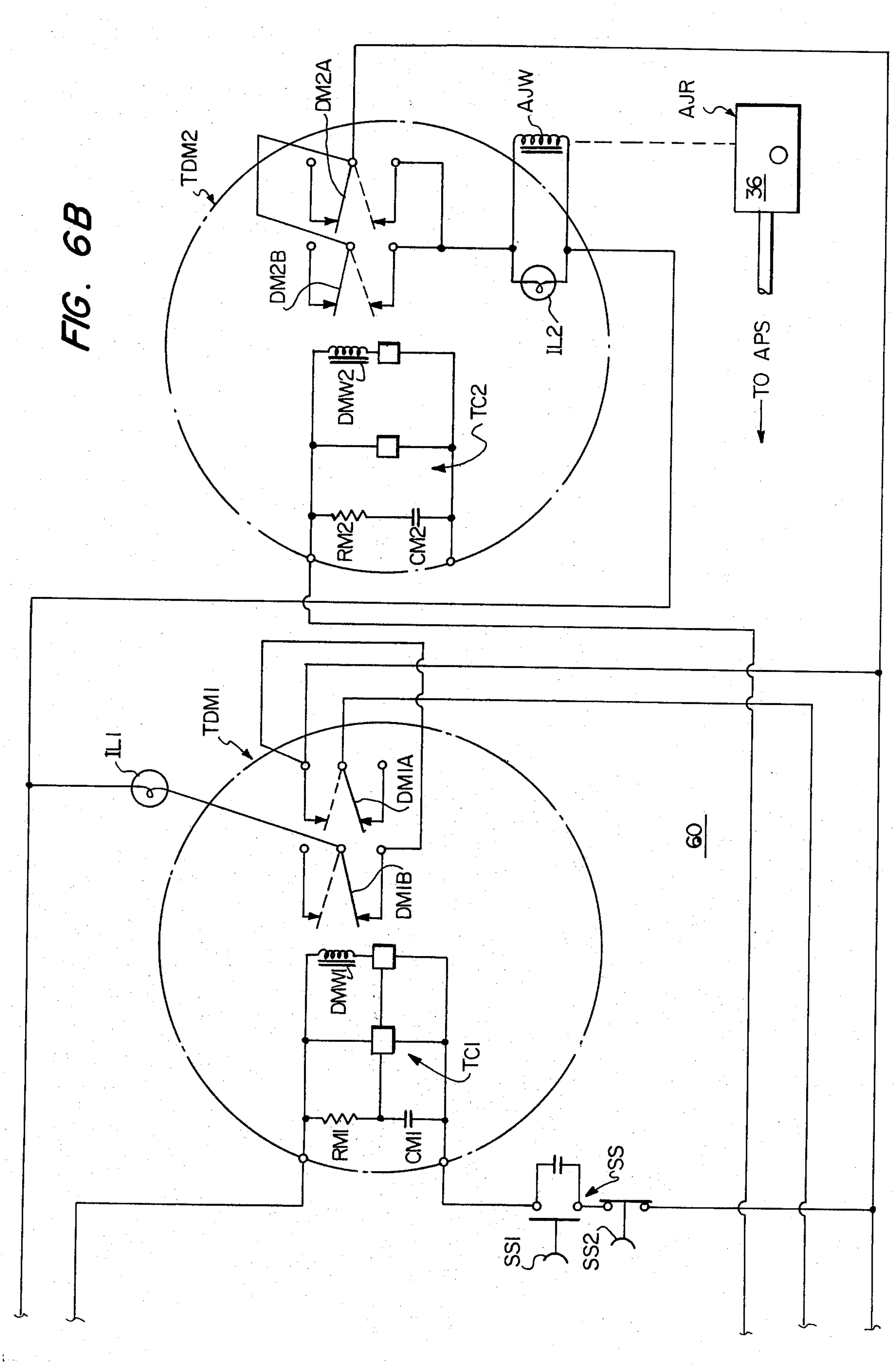

The interrogate microswitch IMS is illustrated in FIG. 6A as having a normally closed open circuit position IMS1 with the cam follower switch arm or cam actuated side of the switch connected directly to the common power lead PLD and a normally open contact position IMS2 connected to a common contact position ER1 in the enabling relay ER.

The enabling relay ER has a normally closed contact position for its armature which is connected in series with the winding MRW of the memory release solenoid MRS to the other common AC power lead PLE such that, when the enabling relay ER is in its normally closed condition and the interrogate switch IMS has been switched to close its normally open contact position IMS2 from its normally closed contact position IMS1, a circuit is completed through the common contact position ER1 and the normally closed contact position ER2 of the enabling relay ER through the winding MRW of the memory release solenoid MRS between the two AC power leads PLD and PLE.

A normally open contact position ER3 of the enabling relay ER extends through a good bottle counter winding GBW to the second AC power lead PLE such that in the event that the enabling relay ER is switched to its normally open position ER3 at the same time that the interrogate switch IMS is switched to its normally open contact position IMS2, a circuit will be completed between the AC power leads PLD and PLE through the good bottle counter winding GBW.

The reject switch MRS has its common switch position RMS1 connected from the second AC power lead PLE to a normally closed switch position RMS2 which is an open circuit and further, includes a normally open contact position RMS3 which is directly connected to one side of a control winding RCW of a reject control relay RCR to be hereinafter more fully described.

The opposite side of the control winding RCW of the reject control relay RCR is connected to a normally closed contact DM1A (terminal pin #8) of a first time delay module TDM1 which is preferably a commercially available P&B (Potter & Brumfield) component CDB3870001. The terminal pin #8 is connected through the normally closed contact DM1A to an open circuited terminal pin #5. The normally open position of the contact DM1A is with respect to a terminal pin #6 which is connected to one common AC power lead PLD and to a terminal pin #4 which is at the normally closed contact position of a second contact DM1B (terminal pin #1) the latter being connected through a first indicator lamp IL1 to the other common AC power lead PLE, to thereby be illuminated in the normally closed condition of the two contacts DM1A and DM1B. The normally open position of the second contact DM1B corresponds to an open circuited terminal pin #3, such that the first indicator lamp will be extinguished upon making the normally open positions of the two contacts DM1A and DM1B.

The first and second contacts DMIA and DMIB of the first time delay module TDM1 are actuated by a relay coil DMW1 which is driven by a solid state trigger circuit TC1 including a timing branch consisting of a series timing resistance RM1 and timing capacitor CM1. A terminal pin #2 is connected to the outer ends of the timing resistor RM1 and to the other of the common AC power leads PLE while a terminal pin #7 connects the outer end of the timing capacitor CM1 to the first AC power lead PLD through push-button STOP/START switch pair SS having a START button SS1 and a STOP button SS2.

A second time delay module TDM2 of identical commercially available configuration to the first time delay module TDM1 is provided and is shown as including a solid state timing circuit TC2 controlling a relay winding DMW2 and including a timing resistor RM2 and a timing capacitor CM2 in the identical configuration previously described with respect to the first time delay module TDM1.

Thus, terminal pins #2 and #7 are connected to the external portions, respectively, of the timing resistor RM2 and the timing capacitor CM2 with the terminal pin #2 and hence the outer end of the timing resistor RM2 being connected directly to a normally closed contact position RCR1 of the reject control relay RCR and thence through that normally closed contact position to the first AC power lead PLD. The terminal #7 and hence, the outermost end of the timing capacitor CM2 are connected directly to the other common AC power lead PLE as well as to one end of a parallel combination of a second indicator lamp IL2 and an air jet solenoid winding AJW.

The opposite side of the indicator lamp IL2 and air jet solenoid winding AJW combination is connected to terminal pins #4 and #5 which correspond to normally open positions of the second and first contacts DM2A and DM2B, respectively, of the second time delay module TDM2. These two contacts DM2A and DM2B together with their corresponding terminal pins #1 and #8 are gang connected in common to the first common AC power lead PLD and in their normally closed positions, which correspond to terminal pins #6 and #3, respectively, these contact are in an open circuit condition.

As in the case of the first time delay module TDM1, the delay module winding DMW2 of the second time delay module TDM2 controls the actuation of the contacts DM2A and DM2B.

The reject control relay RCR has a second set of contacts RCR2 which have their normally closed condition as an open circuit. If this second set of contacts RCR2 is caused to make its normally open position, the result is to connect one side of an air solenoid winding ASW associated with the reject paddle assembly RPA to the first common AC power lead PLD, the opposite side of the air solenoid winding ASW being in constant connection with the other AC power lead PLE to thereby energize the air solenoid control valve ASV intermediate the air pressure source APS and the reject paddle assembly RPA as schematically shown.

Simultaneously with such actuation of the second reject control relay contact RCR2 the first relay contacts RCR1 thereof which are gang connected with the said second contacts RCR2 are caused to break the circuit between the first common AC power lead PLD and the terminal pin #2 of the second time delay module TDM2 to preclude the application of input power to the series connected timing resistor RM2 and timing capacitor CM2 thereof. In this input condition, the second time delay module TDM2 will preclude the air jet solenoid winding AJW from being energized and the second indicator lamp IL2 will be in the extinguished state.

Figure 7:
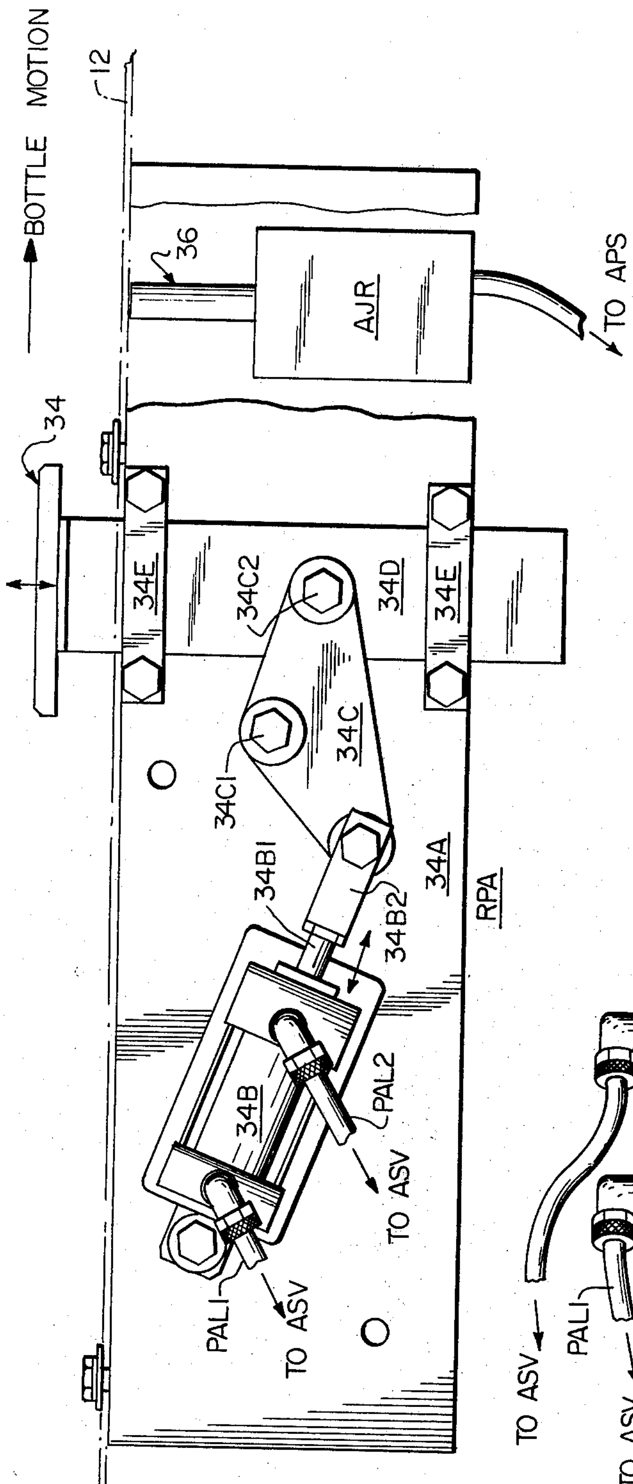
FIG. 7 is a top plan view of a reject paddle assembly of the present invention.
Figure 8:
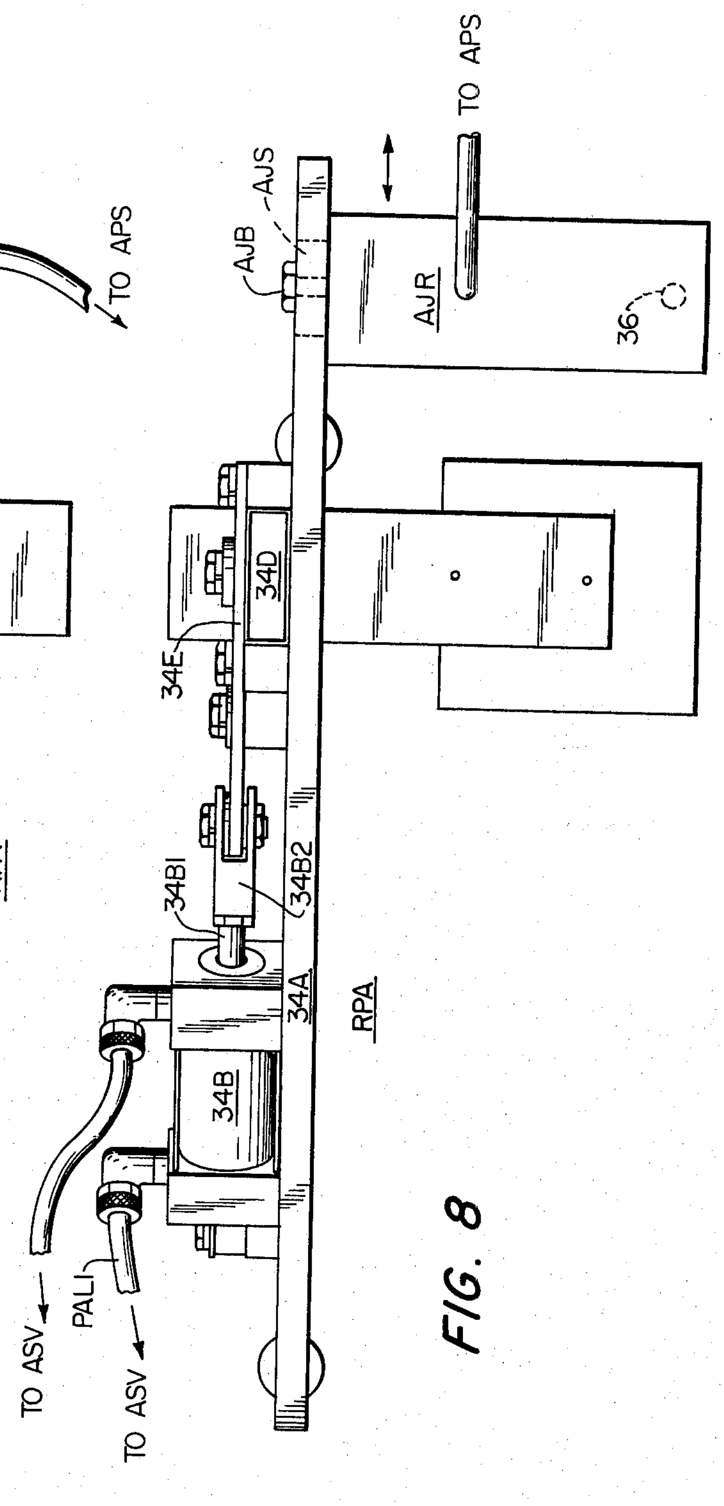
FIG. 8 is a side elevation of the reject paddle assembly of the present invention.

Referring additionally to FIGS. 7 and 8 in conjunction with FIG. 6, the reject paddle assembly RPA is shown as including a mounting plate 34A on which is positioned an air cylinder 34B having input leads PAL1 and PAL2 connected through the air control valve ASV with the air pressure source APS. This configuration provides two-way actuation of the piston rod 34B1 of the air cylinder 34B, which through a pivoted bifurcated coupling 34B2 drives a bell clank member 34C, pivoted at 34C1 to the mounting plate 34A at its central portion and pivoted at its outboard end to a point 34C2 substantially on the longitudinal axis of a reject arm 34D, which reciprocably mounts the reject paddle 34 perpendicular to and dependent from one end thereof adjacent the endless conveyor 14.

The reject arm 34D in a preferred embodiment consists of a rectangular bar having the bar transversely disposed with respect to the mounting plate 34A and held in place by a pair of brackets 34E which serve as sliding journals or the like for the bar 34D.

It can readily be seen that in operation, inward and outward movements of the piston rod 34B1 in the air cylinder 34B causes inward and outward movement, respectively, of the reject paddle 34 with respect to the support plate 34A in the reject paddle assembly RPA.

In the downstream of bottle motion at the outermost end of the support plate 34A and beneath the said support plate 34A is mounted the air jet reject assembly AJR from which the air jet 36 extends to a position immediately adjacent the conveyor 14. The air jet reject assembly AJR includes an air jet reject solenoid which is actuated by the air jet winding AJW previously described in connection with FIG. 6.

The air jet reject assembly AJR, the air jet 36 and the general configuration of the bracket 34A, the reject paddle assembly RPA and the reject paddle mechanism 34 are all shown in an end view in FIG. 2 and in front elevation in FIG. 1.

The air jet reject assembly AJR is slidably adjustable in an upstream and downstream sense with respect to the direction of bottle motion as schematically illustrated in FIG. 8 by the side elevation of a slot AJS in which is included an adjusting screw or bolt AJB, the adjusting slot AJS being formed through the surface of the supporting plate 34A of the reject paddle assembly RPA.

OPERATION OF THE INVENTION

Referring jointly to FIGS. 1, 2, 4 and 5 of the drawings, an initial adjustment of the apparatus of the present invention is made by adjusting the interrogate cam IC on the cam shaft CF in the reject module 38 such that the control arm ICR of the interrogate microswitch IMS will be actuated by the interrogate cam lobe ICL at a point in time just before the hydrostatic pressure head 26 lifts off of a bottle 28, thereby breaking its seal with the bottle brim 28B, at the downstream end of the indexing screw conveyor 16A. This adjustment is effectuated by loosening the interrogate cam retaining clamp 40C and outer hub device 40F such that the interrogate cam IC will be permitted to rotate relative to the common cam shaft CF until the desired timing position has been established. At this point, the retaining clamp 40C and hub device 40F are tightened down to retain the interrogate cam IC in a fixed position of rotation with respect to the common shaft CF. This will cause the common shaft CF and the pulley 44 and the second timing chain 42 to fully synchronize the interrogate cam IC and the common cam shaft CF with the main machine drive motor 20 and the remainder of the machine drive of the bottle testing apparatus 10 of the present invention.

A threshold voltage consistent with a desired threshold pressure at which a given bottle 28 is to be accepted as having proper integrity or not is selected by means of the reference potentiometer RP and the HIGH/LOW switch HLS in the threshold detector TD. For example, when the HIGH/LOW switch HLS is in the open position of its contact, as illustrated in FIG. 6A, the threshold detector will be placed in its high range and threshold voltage of 0–3.75 volts or pressure 0–375 psi is achieved using the pressure transducer PT having an output function of one volt for each 100 psi of detected pressure. When the HIGH/LOW switch HLS is in its contact closed position, the switch is in its low range and a threshold voltage of 0–0.2 volts or pressure of 0–20 psi is provided by adjusting the reference potentiometer RP.

If other than a brim-full condition of the bottles 28 is to be utilized in the hydrostatic test of the bottles, then a desired short-fill level in the bottles 28 should be determined as part of the initial calibration of the testing apparatus 10 in order that the threshold setting in the threshold detector DT and the pressure transducer PT are properly coordinated to accept or reject bottles with that particular short-fill level as a threshold parameter.

In the event that the indexing conveyor 16A has presented a bottle 28 of satisfactory integrity to the hydrostatic pressure head 26, the pressure transducer PT will sense an elevated pressure above the threshold pressure and send a signal to the threshold detector TD which because of the reference setting of the potentiometer RP will result in an enabling output at the terminal pin #10 of the operational amplifier 66 in the threshold detector TD to thereby bias the base of the control transistor 70 and cause the said transducer 70 to conduct, thereby energizing the enabling relay winding ERW of the enabling relay ER. This will cause the enabling relay ER to make its normally open position ER3 and connect the good bottle winding GBW of the good bottle counter across the AC power leads PLD and PLE through the closed interrogate microswitch IMS which is made its normally open position IMS2 by virtue of the engagement of the interrogate cam lobe ICL with the actuating arm ICR of the interrogate microswitch IMS.

In this condition, there will be no actuation of the memory release solenoid since the enabling relay ER will have been switched to break its normally closed contact position ER2 and thereby preclude actuation of the memory release solenoid winding MRW. Further, the memory cam latching lever 46 illustrated in FIG. 4 will not release from the forward rise MCF on the memory cam lobe MCL and will thereby retain the memory cam MC in a nonrotating or fixed position during the next full cycle rotation of the common cam shaft CF.

During this full cycle rotation of substantially 360° of the cam shaft CF, the interrogate cam has carried its interrogate cam lobe ICL past the actuating lever ICR of the interrogate switch IMS and has caused the interrogate switch to return to its normally closed contact position IMS1 which opens the circuit to either the good bottle counter or the memory release solenoid MRS until the next interrogate cycle is commenced by the advent of engagement of the interrogate cam lobe ICL with the actuating roller arm ICR of the interrogate microswitch IMS.

Now, if there is no bottle present during an actuation of the hydrostatic pressure test head 26 or if there is a bottle of unacceptable integrity presented to the hydrostatic test head 26 during the time in which the interrogate microswitch IMS has been closed to the normally open contact position IMS2 by the interrogate cam lobe ICL, the pressure transducer PT will drive the threshold detector TD with a voltage insufficient to enable the enabling relay ER through its winding ERW and therefore, the contacts of the enabling relay ER will remain in their normally closed position ER2 such that a circuit will be completed through the winding MRW of the memory release solenoid MRS, thereby actuating that solenoid, pulling in the armature 50, and releasing the memory cam latching lever 46 via the drag link 48 to free the memory cam MC for rotation with the cam shaft CF and the interrogate cam IC.

Since the speed of rotation of the cam shaft CF, the interrogate cam IC and memory cam MC are timed in full synchronism with the remainder of the testing apparatus 10, a bottle of unacceptable integrity or no bottle at all occurring during the timed pressure testing cycle of the hydrostatic pressure head 26 will result in a reject function at a subsequent point in time downstream from the position occupied by the pressure test head 26 to remove either broken pieces of missing or broken bottles or the entire bottle of unacceptable integrity from the continuous conveyor 14 by means of the reject paddle 34 and the air jet 36 as the case may be.

The memory cam MC in its rotation from the released point of the memory cam lobe MCL, until the time that the rise MCF of that cam lobe engages the roller arm MCR actuating the reject microswitch RMS, determines the memory or delay time of reject function attendant to a preceding detection of a bottle of undesirable integrity or a missing bottle. Therefore, a single revolution of the memory cam occurs between reject cycles to provide the time delay and memory function corresponding to the occurrence of an undesirable or missing bottle.

Upon actuation of the reject microswitch RMS, the normally open position RMS3 will be made and the winding RCW of the reject control relay RCR will be placed across the AC power leads PLD and PLE through the contacts DM1A and terminal pin #6 of the first time delay module TDM1 for a duration determined by the peripheral length of the memory cam lobe MCL.

This actuation of the reject control relay RCR causes the normally open set of contacts RCR2 thereof to complete a circuit through the air solenoid winding ASW associated with the reject paddle assembly RPA (best illustrated in FIGS. 7 and 8) and cause the air solenoid valve ASV to direct air pressure from the air pressure source APS into the line PAL1 of the reject paddle assembly RPA to thereby cause the paddle 34 to move outwardly from its mounting plate 34A and clear away any standing bottle or other debris of sufficient height in its path from the conveyor 14. The reject paddle 34 remains extended for the length of the memory cam lobe MCL and the paddle assembly RPA may be adjustable such that the entire assembly can be moved slightly upstream or downstream to ensure proper timing and alignment with the occurrence of a bottle to be rejected or a void between successive bottles such that all bottles to be rejected will be properly engaged by the paddle 34.

The first time delay module TDM1 is set or enabled by pressing the start switch button SSL of the START/STOP switch SS such that the reject function is precluded for a predetermined initial delay to permit the equipment of the test apparatus 10 to start up and reach operating equilibrium. Otherwise, the first bottle 28 under test would always be rejected. At the end of this delay period, the actuating winding DMW1 is energized and the switch contacts SM1A and DM1B are caused to make to their normally open positions thereby connecting the reject control relay winding RCW through the terminal #6 position to the power lead PLD and extinguishing the first indicator lamp IL1 to thereby indicate that the reject function of the test apparatus 10 is in an enabled state.

Furthermore, prior to the energization of the reject control relay winding RCW, the first set of normally closed contacts RCR1 thereof connect the input terminal pin #2 of the second time delay module TDM2 to the AC power lead PLD and since the terminal pin #7 of the said second time delay module TDM2 is connected to the other AC power lead PLE, the said second time delay module TDM2 and the actuating winding DMW2 therein are energized to place the contacts DM2A and DM2B of the said module in the terminal pin #4 and #5 positions, thereby energizing the air jet solenoid winding AJW and the air jet indicator lamp IL2 to indicate that the air jet 36 in the air jet reject assembly AJR is biased off and ready to engage in a reject cycle.

Upon actuation of the reject control relay RCR, its normally closed contacts RCR1 are caused to break and the power connection of the second time delay module TDM2 is broken, to thereby disable the air jet solenoid winding AJW concurrently with the initial actuation of the reject paddle assembly RPA and the extension of the reject paddle 34, thereby enabling the air jet 36 to blow across the conveyor 14 and purge the latter of glass fragments and debris during the time the reject paddle 34 is extended.

Upon the termination of engagement of the memory can lobe MCL with the actuating arm MCR of the reject microswitch RMS, the latter is caused to break its normally open contact position and return to its normally closed contact position RMS2, thereby disabling the reject control relay RCR through its winding RCW causing its contacts RCR1 to resume their normally closed position and reenergize the second time delay module TDM2. This reenergization of the time delay module TDM2 causes an energization of the air jet solenoid winding AJW which causes the flow of compressed air out of the air jet nozzle 36 to cease after a predetermined time delay controlled by the time constant of the timing resistor RM2 and timing capacitor CM2 of the said second time delay module. This permits the air jet 36 to clear debris from the conveyor 14 boty during and for a predetermined time after the full stroke of the reject paddle 34. The predetermined time interval and the adjusted downstream position of the air jet assembly AJR are selected to permit air purging of the conveyor 14 for the maximum time available between the bottles 28 without disturbing an oncoming bottle.

Thus, the entire testing apparatus 10 and its control circuitry 60 have been reset to be ready to test the next successive bottle 28 in the series of bottles being indexed to the pressure head 26 by the indexing conveyor 16A.

It should be understood that the REJECT SYSTEM FOR IN-LINE PRESSURE TESTING SYSTEMS of the present invention may be modified as would occur to one of ordinary skill in the art without departing from the spirit and scope of the present invention.

It is claimed:

1. Means for testing the integrity of each of a series of liquid filled—liquid tight containers being conveyed in a uniformly spaced and timed sequence past a testing station comprising:

a machine frame defining a test location;

conveyor means on said machine frame for conveying said containers in a uniformly spaced sequence past said test location in continuous motion;

a source of fluid pressure;

hydrostatic pressure head means sealably engaging said containers and applying pressure from said fluid pressure source to the interior of each of said containers during translation thereof through said test location for a corresponding test interval;

pressure sensing transducer means connected with said pressure head means providing an output signal of a magnitude corresponding to said pressure applied to said container during each said test interval;

threshold detecting means responsive to said output signal for providing a control signal output in response to a predetermined threshold value of said output signal;

enabling means responsive to said control signal output for assuming at least first and second states in response to the occurrence and non-occurrence, respectively, of said control signal;

a source of operating power;

interrogate timing means interconnected with said source of operating power and said enabling means for cyclically applying operating power to said enabling means in coordination with the application of pressure to each of said containers at said test location and commencing at a given time in each said test interval and continuing for a predetermined interrogation duration;

reject cycle timing means responsive to one of said states of said enabling means and said interrogate timing means for enabling a reject cycle for a predetermined enabling duration occurring at a time subsequent to a corresponding test interval;

reject apparatus control means responsive to said reject cycle timing means for initiating and terminating said reject cycle over a reject cycle duration at least as great as and concurrently initiated with the enabling duration of said reject cycle timing means; and reject apparatus means actuated by said reject apparatus control means and located downstream of said test station for clearing said conveyor of a said container or any part thereof which occasioned the last prior enablement of said reject cycle timing means.

2. The invention of claim 1, wherein said testing means further includes a source of air pressure;

said reject apparatus means comprises a reject paddle means mounted on said machine frame to reciprocably traverse said conveyor means and an air jet means directed across the surface of said conveyor means for purging debris therefrom; and said reject apparatus control means includes:

means simultaneously extending said reject paddle means across said conveyor means and exhausting said air pressure source through said air jet means in response to the initiation of said enabling duration and retracting said reject paddle means in response to the expiration of said enabling duration; and time delay means terminating the exhausting of said air pressure source through said air jet means at a time subsequent to the said expiration of said enabling duration and correlated with said container spacing to thereby purge the surface of said conveyor for a time period commensurate with the said container spacing.

3. The invention defined in claim 1, wherein:

said interrogate timing means comprises a first cam and first switch means actuated thereby;

said reject cycle timing means comprises a second cam and second switch means actuated thereby and a latching relay means, releasably engaged with said second cam and responsive to a said one state of said enabling means for releasing said second cam to initiate actuation thereof; and said first and second cams are mounted on common drive means and have respective actuating lobes for engaging said first and second switch means;

said lobes having peripheral dimensions determining the respective occurrences and extents of said interrogation and enabling durations.

4. The invention defined in claim 3, wherein said testing means further includes a source of air pressure;

said reject apparatus means comprises a reject paddle means mounted on said machine frame to reciprocably traverse said conveyor means and an air jet means directed across the surface of said conveyor means for purging debris therefrom; and said reject apparatus control means includes:

means simultaneously extending said reject paddle means across said conveyor means and exhausting said air pressure source through said air jet means in response to the initiation of said enabling duration and retracting said reject paddle means in response to the expiration of said enabling duration; and time delay means terminating the exhausting of said air pressure source through said air jet means at a time subsequent to the said expiration of said enabling duration and correlated with said container spacing to thereby purge the surface of said conveyor for a time period commensurate with the said container spacing.

5. The invention of claims 1, 2, 3 or 4 wherein said threshold detecting means includes range selector means providing a plurality of responsive ranges of threshold values; and fine adjustment means in said range selector means for selecting a given said threshold values within a selected said range.

6. The invention of claim 1, wherein said output signal of said pressure sensing transducer means comprises a voltage directly proportional to said pressure applied to said containers; and wherein said threshold detecting means comprises voltage comparator means including operational amplifier means biased to provide said control signal output as a control signal output voltage upon the occurrence of a predetermined value of threshold voltages in said output signal.

7. The invention of claim 6, wherein said voltage comparator means further includes voltage range selector means providing a plurality of responsive ranges of threshold voltages; and fine adjustment means in said voltage range selector means for selecting a given threshold voltage within a selected said range.

8. The invention of claim 6, wherein said enabling means comprises a relay having a winding responsive to said control signal output voltage and first and second closed contact conditions corresponding to the non-occurrence and occurrence, respectively, of said threshold voltage in each test interval; and wherein said first closed contact condition corresponds to said one of said states of said enabling means to which said reject cycle timing means is responsive.

9. The invention of claims 6, 7 or 8, wherein said testing means further includes a source of air pressure;

said reject apparatus means comprises a reject paddle means mounted on said machine frame to reciprocably traverse said conveyor means and an air jet means directed across the surface of said conveyor means for purging debris therefrom; and said reject apparatus control means includes:

means simultaneously extending said reject paddle means across said conveyor means and exhausting said air pressure source through said air jet means in response to the initiation of said enabling duration and retracting said reject paddle means in response to the expiration of said enabling duration; and time delay means terminating the exhausting of said air pressure source through said air jet means at a time subsequent to the said expiration of said enabling duration and correlated with said container spacing to thereby purge the surface of said conveyor for a time period commensurate with the said container spacing.

10. The invention of claims 6, 7 or 8, wherein:

said interrogate timing means comprises a first cam and first switch means actuated thereby;

said reject cycle timing means comprises a second cam and second switch means actuated thereby and a latching relay means, releasably engaged with said second cam and responsive to a said one state of said enabling means for releasing said second cam to initiate actuation thereof; and said first and second cams are mounted on common drive means and have respective actuating lobes for engaging said first and second switch means;

said lobes having peripheral dimensions determining the respective occurrences and extents of said interrogation and enabling durations.

11. The invention of claims 6, 7 or 8, wherein said testing means further includes a source of air pressure;

said reject apparatus means comprises a reject paddle means mounted on said machine frame to reciprocably traverse said conveyor means and an air jet means directed across the surface of said conveyor means for purging debris therefrom; and said reject apparatus control means includes:

means simultaneously extending said reject paddle means across said conveyor means and exhausting said air pressure source through said air jet means in response to the initiation of said enabling duration and retracting said reject paddle means in response to the expiration of said enabling duration; and time delay means terminating the exhausting of said air pressure source through said air jet means at a time subsequent to the said expiration of said enabling duration and correlated with said container spacing to thereby purge the surface of said conveyor for a time period commensurate with the said container spacing; and wherein:

said interrogate timing means comprises a first cam and first switch means actuated thereby;

said reject cycle timing means comprises a second cam and second switch means actuated thereby and a latching relay means, releasably engaged with said second cam and responsive to a said one state of said enabling means for releasing said second cam to initiate actuation thereof; and said first and second cams are mounted on common drive means and have respective actuating lobes for engaging said first and second switch means;

said lobes having peripheral dimensions determining the respective occurrences and extents of said interrogation and enabling durations.

12. The invention of claim 11, wherein said reject cycle enabling means comprises:

enabling relay means having first and second output states corresponding, respectively, to said unacceptable and acceptable states of article integrity;

interrogate cycle means cyclically permitting said reject enabling means to respond to a state of each said article during each application of said test parameter;

synchronous timer means including enabling duration determining means responsive, conjunctively, to said interrogate cycle means and said first output state of said enabling relay means, to assume a reject cycle enabling state for said enabling duration after a predetermined memory duration; and said memory duration being correlated with said known spacing between said articles in said sequence to enable a said reject cycle for an unacceptable article when that article has been conveyed downstream from said test station.

13. The invention of claim 12, wherein said unacceptable state of article integrity includes the absence of a said article from a space in said sequence; and said reject cycle is enabled when a said space in said sequence absent a said article has been conveyed downstream from said test station.

14. The invention of claim 12, wherein said reject cycle control means includes time delay means responsive to the termination of said enabling duration of said reject cycle enabling means for estending said reject duration beyond said termination of said enabling duration.

15. The invention of claim 14, wherein said unacceptable state of article integrity includes the absence of a said article from a space in said sequence; and said reject cycle is enabled when a said space in said sequence absent a said article has been conveyed downstream from said test station.

16. The invention defined in claims 12, 17, 18 or 15, wherein said test and reject cycle controlling means further includes counting means providing an indication of the number of acceptable articles in a given sequence;

said counting means being responsive, conjunctively, to said interrogate cycle means and the occurrence of said second output state of said enabling relay means to provide an acceptable article count.

17. The invention defined in claims 1, 2, 3, 4, 6, 7 or 8, which further includes counting means providing an indication of the number of acceptable articles in a given sequence.

18. The invention of claims 1, 2, 3 or 4 wherein said threshold detecting means includes range selector means providing a plurality of responsive ranges of threshold values;

fine adjustment means in said range selector means for selecting a given said threshold values within a selected said range; and counting means providing an indication of the number of acceptable articles in a given sequence.

19. Means controlling test and reject cycles in an article integrity testing apparatus having a sequence of articles conveyed through a test station at a known velocity and spacing to remove undesirable articles from said sequence, comprising:

means for synchronously applying a test parameter determinative of article integrity to each of said articles at said test station;

threshold detection means responsive to a predetermined threshold value of said test parameter to determine acceptable and unacceptable states of article integrity for each said article in said sequence;

reject cycle enabling means responsive to a said unacceptable state of article integrity as determined by said threshold detection means for assuming a reject cycle enabling state over a predetermined enabling interval at a time subsequent to said determination of article integrity; and reject cycle control means responsive to said reject cycle enabling means for initiating and terminating a said reject cycle over a reject duration at least as great as and concurrently initiated with the enabling duration of said reject cycle enabling means.

20. The invention of claim 19, wherein said unacceptable state of article integrity includes the absence of a said article from a space in said sequence.

21. The invention of claim 19, wherein said reject cycle control means includes time delay means responsive to the termination of said enabling duration of said reject cycle enabling means for extending said reject duration beyond said termination of said enabling duration.

22. The invention of claim 21, wherein said unacceptable state of article integrity includes the absence of a said article from a space in said sequence.

23. The invention defined in claims 19, 20, 21 or 22, which further includes counting means providing an indication of the number of acceptable articles in a given sequence.

* * * * *